Patented June 3, 1947

2,421,392

UNITED STATES PATENT OFFICE 2,421,392

SENSITIZATION OF HYDROGEN BROMIDE CATALYZED OXIDATION REACTIONS

Frederick F. Rust, John H. Raley, and William E. Vaughan, Berkeley, Calif., assignors to Shell Development Company, San Francisco, Calif., a corporation of Delaware No Drawing. Application January 17, 1944, Serial No. 518,664

8 Claims. (Cl. 260—533)

This invention relates to the controlled non-explosive oxidation of organic compounds containing one or more replaceable hydrogen atoms. In one of its more specific embodiments it pertains to an improved process for effecting the catalytic oxidation of such organic compounds to produce high yields of carboxylic acids, alcohols, ketones and/or organic peroxides having either the same or twice the number of carbon atoms per molecule as the primary starting material treated.

It has been previously discovered that carboxylic acids, ketones and/or organic peroxides may be produced by subjecting organic compounds having at least one replaceable hydrogen atom to a partial and controlled oxidation in the presence of hydrogen bromide which latter catalyzes and controls the reaction. More specifically stated, it has been discovered that the above-mentioned and hereinbelow more fully described organic compounds may be subjected to a controlled, non-explosive oxidation in the presence of a catalyst consisting of hydrogen bromide to produce high yields of desirable carboxylic acids, organic peroxides and/or ketones containing at least the same number of carbon atoms per molecule as the starting organic material thus subjected to the oxidation. For instance, U. S. patent application, Serial No. 474,220, filed January 30, 1943, discloses and claims a process for the controlled, partial and non-explosive oxidation of aliphatic and particularly saturated aliphatic hydrocarbons and of their products of partial halogenation, to produce carboxylic acids and/or ketones having the same number of carbon atoms per molecule as the starting material treated. In accordance with the process disclosed and claimed in said application, this oxidation is effected by subjecting the saturated organic materials, such as ethane, propane and butane, as well as their products of halo-substitution, to the action of oxygen at an elevated temperature which is, however, below that at which spontaneous combustion occurs, this oxidation being effected in the presence of a catalyst comprising or consisting of hydrogen bromide. Also, U. S. patent application, Serial No. 474,221, filed January 30, 1943, covers a process for the controlled, non-explosive oxidation of aromatic hydrocarbons and particularly of alkylated aromatic hydrocarbons to produce phenol, substituted phenols, aromatic carboxylic acids, organic peroxides, and/or ketones having the same number of carbon atoms per molecule as the starting material, this oxidation being effected by subjecting the mentioned aryl or aralkyl hydrocarbons or their partially halogenated derivatives to the action of oxygen at an elevated temperature which is preferably above about 100° C., but below the temperature capable of causing spontaneous combustion, and in the presence of hydrogen bromide employed as the catalyst. U. S. patent application, Serial No. 474,222, now U. S. Patent 2,369,181, discloses and claims a similar process for the production of predetermined oxygenated products by the controlled catalytic oxidation, under non-explosive conditions, of alicyclic hydrocarbons and of their halogenated derivatives, while U. S. patent application, Serial No. 474,224, filed January 30, 1943, now U. S. Patent 2,395,523, covers a process for the production of novel organic peroxides and organic hydroperoxides by the controlled oxidation of isoparaffins such as isobutane. Similarly, U. S. patent application, Serial No. 480,862, filed March 27, 1943, now U. S. Patent 2,369,182, is directed to the production of certain unsaturated carboxylic acids and/or ketones by the controlled hydrogen bromide catalyzed oxidation, under non-explosive conditions, of unsaturated organic compounds such as unsaturated aliphatic hydrocarbons, while U. S. patent application, Serial No. 486,458, filed May 10, 1943, covers a process for the production of unsubstituted and halo-substituted unsaturated carboxylic acids by the controlled oxidation of halogenated unsaturated hydrocarbons. In all of these cases the controlled oxidation is effected in the presence of a catalyst consisting of or comprising hydrogen bromide which, as stated, may be introduced as such into the reaction zone or formed in situ under the operating conditions employed.

The above-outlined inventions are predicated on the discovery that the presence of hydrogen bromide during the catalytic oxidation of the above-mentioned and hereinbelow more fully described organic compounds controls the oxidation reaction so that the oxidation occurs on the carbon atom or atoms to which a halogen atom, such as a bromine atom, would normally attach itself if the starting material were subjected to a halo-substitution reaction. Also, it appears that the presence of the hydrogen bromide, besides retarding the explosion or complete combustion of the organic starting material, has the effect of inhibiting the decomposition of the carbon structure of the starting organic material so that the resultant oxygenated compound or compounds contain the same number of carbon atoms per molecule as the starting organic material or, as in the case of certain organic peroxides such as those formed during the controlled catalytic oxidation of isoparaffins, contain twice the number of carbon atoms per molecule present in the starting material treated.

It has now been discovered that the catalytic non-explosive oxidation of organic compounds, and particularly of the group of organic compounds described more fully hereinbelow, may be realized more effectively by subjecting these organic starting materials under the defined temperature and pressure conditions to the action of oxygen in the presence of hydrogen bromide and of relatively small amounts of certain substances which apparently act as sensitizers. As will be pointed out hereinbelow and particularly in the examples, the use of these substances during the catalytic oxidation of the organic materials in the presence of hydrogen bromide greatly increases the yield of the desired oxygenated products, reduces the concentration of the hydrogen bromide necessary for effecting the desired reaction, and increases the rate of conversion even in the cases where the reaction is effected at temperatures considerably below those necessary for the similar controlled catalytic oxidations, which are effected in the absence of these sensitizing materials. Additionally, the presence of the sensitizers permits the effecting of the hydrogen bromide catalyzed oxidation reactions at temperatures at which explosions would normally occur but for the presence of these sensitizing materials. Still another advantage of the present process resides in the fact that economical yields of the desired oxygenated products may be obtained with hydrogen bromide concentrations materially below those necessary when no sensitizer is employed, this decrease in the hydrogen bromide concentration being considerably greater than the amount of sensitizer necessary for such lowering of the hydrogen bromide concentration. The use of the hereinabove mentioned and hereinbelow more fully described class of sensitizers also permits the controlled oxidation at temperatures which are insufficient to effect the production of the desired oxygenated products during controlled oxidations when no sensitizer is used. Also, the addition of the sensitizer greatly increases the yield of the desired products, this increase being considerably greater than that obtainable by an equivalent increase in the hydrogen bromide concentration.

The present process is applicable to the oxidation of all organic compounds which contain at least one replaceable hydrogen atom, the process being effective for the controlled oxidation of aliphatic hydrocarbons, particularly saturated aliphatic hydrocarbons, as well as of aromatic hydrocarbons, alkylated aromatic hydrocarbons, alicyclic hydrocarbons, which may or may not contain one or more saturated or unsaturated aliphatic side-chains, as well as of their derivatives such as the products of their partial halo-substitution. Also, various other organic derivatives, e. g. nitriles, ketones, etc., fall within the class of organic compounds that may be employed as the starting material. For example, methyl ethyl ketone may be readily oxidized according to the present process to produce diacetyl. A particularly suitable class of organic compounds that may be subjected to the hydrogen bromide catalyzed controlled oxidation in the presence of the sensitizers of the present invention comprise the straight-chain organic compounds, particularly straight-chain paraffins, as well as other organic compounds the oxidation of which is difficult and thus ordinarily requires comparatively rigorous conditions. Cyclohexane is a typical example of such organic compounds. Another group includes compounds of the type of ethyl benzene which, when oxidized in accordance with the process of the present invention, produces acetophenone. As pointed out above, the use of the sensitizers permits the oxidation with hydrogen bromide concentrations and temperatures considerably lower than those essential for the controlled oxidation in the absence of sensitizers. Such treatment decreases the undesirable side reactions of the type of ketone condensation reactions.

Representative organic compounds of the class that may be oxidized in accordance with the process of the invention include the straight-chain and branched-chain saturated aliphatic hydrocarbons such as ethane, propane, butanes, pentanes, hexanes, heptanes, octanes and the like; the alicyclic hydrocarbons such as cycloparaffin, cyclobutane, cyclopentane, cyclohexane, the higher homologues thereof; and the alkylated cycloparaffins such as methyl cyclopentane, methyl cyclohexane, and the like; aryl and aralkyl hydrocarbons such as naphthalene, toluene, xylenes, ethyl benzene, n-propyl benzene, butylbenzenes, and the like; the partially halo-substituted derivatives of the above-mentioned and similar hydrocarbons such as ethyl chloride, dichlorethane, dibrompropanes, monochlorbutanes, monobrombutanes, dichlorbutanes, monochlorcyclopentane, benzyl chloride, benzyl bromide, and their homologues and analogues. Also, the corresponding unsaturated hydrocarbons and halogenated derivatives thereof are included together with other derivatives of the above-defined class of hydrocarbons. As mentioned, the straight-chain aliphatic hydrocarbons, as well as compounds of the type of cyclohexane, ethyl benzene, and the like, are compounds especially suitable as the starting material in the controlled oxidation reaction effected in accordance with the process of the present invention.

Generally speaking, the class of sensitizers to be employed as promoting agents in the hydrogen bromide catalyzed controlled oxidation of the organic compounds of the class defined hereinabove comprises organic peroxides which are unstable under the operating conditions, as well as compounds which produce such unstable peroxides under the operating conditions employed. A particularly suitable class of organic peroxides that may be employed as the sensitizers comprise the organic peroxides in which each oxygen atom of the peroxy group is attached to an aliphatic and preferably a saturated aliphatic radical, in which the carbon atom directly attached to the peroxy oxygen atom is a tertiary carbon atom, i. e. one directly attached to three other carbon atoms. The following are representative examples of this class of organic peroxides: ditertiary butyl peroxide, ditertiary amyl peroxide, tertiary butyl tertiary amyl peroxide, as well as other peroxides in which tertiary alkyl radicals are attached to the peroxy oxygen atoms. Another group of organic peroxides suitable as sensitizers includes the dialkyl peroxides, particularly the lower homologues of the dialkyl peroxides, in which either or both of the radicals attached to the peroxy oxygen atoms are attached thereto via a primary or secondary carbon atom. This group includes compounds of the type of diethyl peroxide, di-isopropyl peroxide, isopropyl tertiary butyl peroxide, and the like. The corresponding organic hydroperoxides, such as ethyl hydroperoxide, isopropyl hydroperoxide, tertiary butyl hydroperoxide, tertiary amyl hydroperoxide, and the like, also fall within the above-defined class of peroxides suitable as sensitizers.

It was said above that the organic peroxides used as the sensitizers may be either added as such or formed in situ during the oxidation reaction. A large number of organic compounds will readily form organic peroxides when subjected to oxidation in the presence of hydrogen bromide employed as the catalyst. A particularly suitable class of such organic compounds comprises those which contain a tertiary carbon atom bonded to a hydrogen atom, e. g. 2,3-dimethyl butane. Other compounds that are suitable as sensitizers in the process of the present invention and are believed to form unstable peroxides in situ during the oxidation reaction include diisopropyl ether, 2-chloropropene, isopropyl chloride, isopropyl bromide, and like halogenated compounds.

Since these compounds form organic peroxides when subjected to the hydrogen bromide catalyzed oxidation, it is to be understood that the term "oxidation in the presence of organic peroxides," as employed herein and in the appended claims, includes oxidations in which compounds of this group have been added, these compounds then forming unstable organic peroxides which, in turn, are decomposed under the operating conditions to yield radicals capable of sensitizing the desired reaction.

The amount of the sensitizer to be employed will vary within relatively wide limits, although optimum amounts or percentages may be readily determined for each individual case. Generally speaking, the concentration of the sensitizer will vary from a small fraction of 1%, e. g. about 0.1% or less, to about 4% or 5% or more, e. g. 10%, as calculated on the volume of the reactants introduced into the reaction zone. Satisfactory results have been obtained when the sensitizer concentration was in the neighborhood of about 1% by volume. The optimum amount of the sensitizer to be used will depend on a number of variables, such as the particular organic material treated, the hydrogen bromide concentration, the specific temperature employed, etc. The use of a given amount of the sensitizer in lieu of the same amount of hydrogen bromide will materially improve the yield of the desired oxygenated products. However, it is still necessary to use the hydrogen bromide which apparently acts as the catalyst. Therefore, an increase in the sensitizer concentration will permit the reduction in the hydrogen bromide concentration only to a certain minimum, which is apparently above the amount of hydrogen bromide which, under equilibrium conditions in the operating zone, reacts with the organic starting material to produce alkyl bromides. In order to obtain optimum yields, it is preferred to correlate the hydrogen bromide and sensitizer concentrations.

It was stated above that the slow or non-explosive controlled oxidation of the above-outlined class of organic compounds, when effected in the presence of hydrogen bromide, is realized at temperatures below those at which spontaneous combustion or substantial decomposition of the carbon structure occurs. It was also stated that the presence of the sensitizers, at least in some cases, permits the use of relatively lower reaction temperatures, while at the same time attaining the same or greater yields of the desired oxygenated products as compared with those obtained when the reaction is effected in the presence of hydrogen bromide but in the absence of the sensitizer. The upper temperature limit will depend on the specific organic substance to be oxidized, the proportions of the organic substances, oxygen, hydrogen bromide, and organic peroxide present in the mixture subjected to the elevated temperatures. Generally speaking, this upper temperature limit is in the neighborhood of about 225° C., although some of the more stable organic compounds of the defined class may be heated to even higher temperatures, e. g. about 250° C., particularly when the reaction is effected in the presence of relatively larger concentrations of the sensitizer and of inert diluents, such heating failing to cause the mixture to decompose to carbon and other undesirable products of decomposition. In this connection it must be noted that excessively high temperatures, even though they are below the explosive region, should be avoided because of certain undesirable side reactions, such as the reaction of the hydrogen bromide with the organic compounds and oxygen to form the corresponding organic bromides. Although the upper temperature limit was mentioned to be in the neighborhood of about 225° C., this temperature may be raised above this limit, particularly when shorter contact periods, relatively more stable compounds, and/or higher concentrations of the sensitizer are employed. On the other hand, some of the more readily oxidizable compounds may be economically oxidized according to the present process at lower temperatures, such as between about 150° C. and about 175° C., particularly when the reaction is effected with relatively larger percentages of the more active sensitizers, such as ditertiary butyl peroxide and/or isopropyl chloride. Other conditions being equal, a further decrease in the operating temperature generally decreases the output of the product per unit of time, so that at temperatures materially below about 100° C. the controlled oxidation in the presence of hydrogen bromide and of the above-mentioned sensitizers may become uneconomical.

Although the volumetric ratios of the organic starting material to the oxygen may vary within relatively wide limits, satisfactory yields of the desired oxygenated product or products can be obtained by using equivolumetric quantities thereof. As to the amount of hydrogen bromide to be employed as the catalyst, this amount may also vary, although optimum amounts or percentages which may be readily determined for each case will depend on a number of variables. Thus, it has been stated that an increase in the concentration of the sensitizer in the reaction mixture, other conditions being equal, will permit a decrease in the hydrogen bromide concentration. When the reaction is effected in the presence of the sensitizers, the hydrogen bromide concentration may be considerably below the 20% which has been set in the previously mentioned patent applications as constituting the approximate upper limit.

The oxidation in accordance with the present process may be effected at atmospheric pressure, although higher or lower pressures may also be employed. Generally it is preferable to use superatmospheric pressures because more of the mixture subjected to treatment may be conveyed through a given unit of reaction space per unit of time.

The oxidation reaction may be effected in the liquid or vapor phase or in a two-phase liquid-vapor system. Since it is difficult to maintain a desirable relatively high oxygen concentration when the reaction is conducted in the liquid phase, it is generally preferable to effect the reaction in accordance with the process of the present invention in the vapor phase. Some of the higher-boiling organic compounds cannot be effectively maintained in the vapor state and in contact with sufficient concentrations of oxygen and hydrogen bromide without causing the spontaneous combustion of such a mixture. The oxidation of these organic compounds may be readily effected in the presence of an inert diluent or carrier such as steam, nitrogen, carbon dioxide and even methane, which latter is relatively stable at the temperatures at which the above-mentioned organic compounds may be oxidized in accordance wtih the process of the present invention.

The invention may be executed in a batch, intermittent or continuous manner. When operating in a continuous system, all of the organic compound, oxygen, hydrogen bromide and sensitizer, as well as the diluent if such is used, may be first mixed and the mixture thus formed may then be conveyed through the whole length of the reaction zone. In the alternative, it is possible to introduce at least a portion of the sensitizer, hydrogen bromide catalyst and/or one or both of the reactants, i. e. oxygen and the organic material subjected to oxidation, at various intermediate points along the reaction zone. Such operation may be frequently desirable to control the operating conditions in the reaction zone and also to increase the yield of the desired products. For instance, as will be shown in the examples, stage injection of even minor amounts of an organic peroxide at various intermediate points along the length of the reaction zone materially increases the overall yield of desired products of oxidation. The contact time may vary within rather wide limits and at least in part depend on the type and amount of the various compounds conveyed through the reaction zone, as well as on the other operating conditions. Generally in a continuous system, it has been found that satisfactory yields of the desired carboxylic acids, organic peroxides and/or ketones (which latter term refers to organic compounds having one or more ketonic carbonyl groups) may be obtained with contact periods of between about 1 minute and about 3 minutes, although shorter or longer contact times may also be employed.

The following examples will illustrate the process of the present invention and the advantages and benefits derived from employing organic peroxides as sensitizers for the hydrogen bromide catalyzed controlled oxidation of organic compounds. It is to be understood, however, that there is no intention to be limited by any details set forth in these examples.

*Example I*

The reactor consisted of a glass coil having an internal diameter of 25 mm. This coil had a volume of 2980 cc., and was immersed in an oil bath which permitted accurate control of the reaction temperature. A preheated gaseous mixture of propane, oxygen and hydrogen bromide, which substances were used in a volumetric ratio of 8:8:1, was conveyed at substantially atmospheric pressure through the coil at such a rate that the residence time was about 3 minutes. The temperature was maintained at about 189° C. It was found that under these conditions only about 17% of the introduced oxygen reacted to form oxygenated products predominating in acetone.

*Example II*

This run was identical with that described in the previous example, with the exception that di-tertiary butyl peroxide was introduced, together with the reactants and the catalyst, in an amount slightly less than about 0.2% by volume of the vapors passing through the reaction zone. The presence of this sensitizer even in the mentioned low concentration more than doubled the oxygen consumption, the amount of oxygen reacting to form the oxygenated products, e. g. acetone, being equal to about 36%.

*Example III*

A gaseous mixture consisting of 2 parts by volume of propane, 2 parts by volume of oxygen and 1 part by volume of hydrogen bromide was conveyed through the same reactor as that used in the above-described runs. The residence time was about 3 minutes, the reaction temperature being maintained at about 184° C. It was found that under these conditions about 58% of the introduced oxygen reacted to form oxygenated products.

*Example IV*

The run described in the previous example was repeated except for the fact that the reaction temperature was maintained at about 164° C., and that isopropyl chloride vapors, in an amount equal to about 2½% by volume of all of the vapors passing through the reactor, were substituted for an equal amount of propane. It was found that the addition of the sensitizer increased the consumption of oxygen to about 76%, in spite of the fact that the operating temperature was about 20° C. lower than that employed in the run in which no sensitizer was employed. It must be noted that substantially no oxidation of propane occurs when the above-mentioned reaction is attempted at a temperature of 164° C. in the presence of hydrogen bromide but in the absence of a sensitizer.

*Example V*

The reactor described in Example I was employed. A gaseous mixture consisting of 2 parts by volume of propane, 2 parts by volume of oxygen, 1 part by volume of hydrogen bromide, and isopropyl bromide employed in an amount equal to about 3% by volume of the total mixture, was conveyed through the above reactor at substantially atmospheric pressure and at such a rate that the residence time was about 3 minutes. The temperature in the coil was maintained at about 165° C. It was found that about 60% of the oxygen reacted to form oxygenated products. By comparing this run with that described in Example III it is seen that the presence of the small amount of isopropyl bromide permitted the lowering of the reaction temperature from 184° C. to 165° C. and at the same time caused a somewhat large oxygen consumption as compared with that obtained in the run in which no sensitizer was used.

*Example VI*

The run described above was repeated except for the fact that about 2½% by volume of di-isopropyl ether was used in lieu of the isopropyl bromide, the reaction being effected at a temperature of 170° C. It was found that about 45% of the introduced oxygen reacted to form oxygenated products as compared to substantially no oxidation when the same reaction is attempted at this temperature in the absence of any sensitizer.

*Example VII*

A gaseous mixture consisting of 2 parts by volume of propane, 2 parts by volume of oxygen, 1 part by volume of hydrogen bromide, and di-tertiary butyl peroxide employed in an amount equal to about 1.2% by volume of the total mixture, was conveyed through the above-described reactor at such a rate that the residence time was about 3 minutes. The reactor temperature was about 165° C. Approximately 66.6% of the introduced oxygen was found to have reacted to produce oxygenated products, thus clearly proving the advantageous effects attained by the use of di-tertiary butyl peroxide as the sensitizer.

*Example VIII*

The run described in Example I was repeated with the same reactants and under the same conditions except for the fact that about 0.2% by volume of di-tertiary butyl peroxide was continuously fed into the stream at the entrance to the reaction zone. It was found that about 36% of the introduced oxygen reacted to produce oxygenated products.

*Example IX*

This run was identical with that described in Example VIII, with the exception that about 0.2% by volume of di-tertiary butyl peroxide (together with 37 times its volume of propane) was also continuously fed into the reactor at a point about ¼ the distance from the entrance, and that like streams of the peroxide in carrier propane were also continuously fed at points approximately ½ and ¾ the distance from the entrance to the reactor. It was found that about 54% of the introduced oxygen reacted to produce oxygenated products predominating in acetone. A comparison of the results of runs described in Examples I, VIII and IX clearly shows the advantages of using a sensitizer, as well as the stage injection thereof at various points along the path of the reactants through the reaction zone.

*Example X*

Three runs were effected using the reactor described in Example I. In the first of these runs a mixture of ethane, oxygen and hydrogen bromide was conducted at such a rate that 240 cc. per minute of ethane, 240 cc. per minute of oxygen, and 120 cc. per minute of hydrogen bromide were conveyed into the reactor, the reaction time being thus equal to about three minutes. The reaction temperature was maintained at about 210° C. The same conditions were maintained in the second run, except that 1 cc. per minute of di-tertiary butyl peroxide was fed together with the reactants. In the third run (in which the reactants and the hydrogen bromide were introduced into the reactor at the above-mentioned rates), 1 cc. per minute of di-tertiary butyl peroxide was introduced at the entrance into the reactor and three streams of di-tertiary butyl peroxide together with the carrier ethane were introduced into the reactor at points ¼, ½ and ¾ the distance, respectively, from the inlet thereto. The di-tertiary butyl peroxide was introduced at each of these points at a rate of 1 cc. per minute in 37 times its volume of ethane. Analyses of the effluent mixtures leaving the reactor, as well as of the reaction products thus produced, showed that the oxygen consumption per minute was 118 cc. in the first case, 123 cc. in the second run, and 148 cc. in the third run, the yield of the organic acids per minute being equal to 45 cc., 52 cc. and 67 cc., respectively, these figures being given as vapor volumes.

*Example XI*

This run was effected in the reactor described above. A gaseous mixture of propane, oxygen and hydrogen bromide employed in a volumetric ratio of 8:8:1 was conveyed through the reactor at such a rate that a total of 510 cc. per minute of these substances was conveyed through the reactor, the residence time being equal to about 3 minutes. The reaction temperature was maintained at 189° C. It was found that under these conditions the oxygen consumption was 36 cc. per minute. The ketone yield was equal to 0.6 millimole per minute, while the yield of carboxylic acid was equal to 0.01 millimole per minute.

In order to show the effect of the introduction of the sensitizer, di-tertiary butyl peroxide was introduced at a rate of 7 cc. per minute, this sensitizer being fed (in unequal amounts) at the entrance into the reactor as well as at points about ¼, ½ and ¾ the distance, respectively, from said entrance. As stated, the total rate of introduction of the sensitizer was 7 cc. per minute, this sensitizer, except for the portion fed at the entrance, being introduced together with 37 times its volume of propane. The oxygen consumption was 137.5 cc. per minute, the ketone yield being 2.9 millimoles per minute, while the carboxylic acid was produced in an amount equal to 0.42 millimole per minute.

*Example XII*

A gaseous mixture, consisting of toluene, oxygen and hydrogen bromide employed in a volumetric ratio of approximately 2:1:1, was conveyed through the above-mentioned reactor at such a rate that the residence time was about three minutes, the reaction temperature being maintained at about 150° C. It was found that approximately 22.6% of the introduced oxygen reacted to produce oxygenated products including benzoic acid.

When the above reaction was repeated, except for the fact that ditertiary butyl peroxide was added in an amount equal to about 10% of the added hydrogen bromide, the oxygen consumption increased to about 31.6%.

*Example XIII*

A gaseous mixture consisting of cyclohexane, hydrogen and hydrogen bromide employed in a volumetric ratio of 2:2:1 and containing di-tertiary butyl peroxide in an amount equal to about 5% by volume of the reactants and catalyst, is conveyed through the above-mentioned reactor at such a rate that the residence time is equal to about 3 minutes. The presence of the sensitizer permits satisfactory oxidation of the cyclohexane to cyclohexanone at a temperature considerably below that necessary for a similar hydrogen bromide catalyzed oxidation effected in the absence of di-tertiary butyl peroxide.

Example XIV

A series of runs was effected in the above-described reactor. In all of these runs propane and oxygen were introduced into the reactor at rates of 465 cc. per minute and 480 cc. per minute respectively. The contact time varied between about 1.5 and 1.8 minutes, the temperature in all of the runs being maintained at 189° C. The hydrogen bromide was employed in varying amounts, some of the runs being effected without the addition of any sensitizer while others were conducted in the presence of different sensitizers of the class defined above. The conditions employed and the oxygen consumptions obtained are set forth in the following table:

| Sensitizer | Per cent Oxygen Consumption at Following HBr Flows | | | |
|---|---|---|---|---|
| | 51 cc./min. | 78 cc./min. | 120 cc./min. | 204 cc./min. |
| None | 8.1 | 12.1 | 14.4 | 26.3 |
| 15 cc./min. of isopropyl chloride | 10.6 | 13.7 | 25.4 | |
| 18 cc./min. of isopropyl bromide | 12.1 | 13.7 | | 71.9 |
| 15 cc./min. of 2-chloropropene | 12.7 | 16.1 | 26.2 | 62.5 |
| 15 cc./min. of 2,3-dimethyl butane | 17.3 | | 29.6 | 51.2 |
| 15 cc./min. of di-isopropyl ether | | | 25.4 | |
| 2 cc./min. of di-tertiary butyl peroxide | 16.9 | 20.4 | 28.6 | |
| 4 cc./min. of di-tertiary butyl peroxide | 27.9 | 33.7 | | |

An analysis of the above results clearly indicates that increased oxygen consumption is obtained when the above-defined sensitizing agents are added to a mixture containing a fixed amount of hydrogen bromide. Also, the results show that considerably lower amounts of catalyst may be used to attain a given oxygen consumption when a sensitizer is added to the reaction mixture. For instance, the addition of even minor amounts of isopropyl chloride results in the same oxygen consumption with half the hydrogen bromide necessary for the oxidation in the absence of this sensitizer. Also, the addition of minor amounts of di-tertiary butyl peroxide permits the use of hydrogen bromide in an amount equal to ¼ that necessary for the same degree of oxygen consumption in the absence of the sensitizer.

We claim as our invention:

1. A process for the production of acetone which comprises subjecting a substantially equivolumetric mixture of propane and oxygen, at substantially atmospheric pressure and at a temperature of between about 100° C. and about 225° C., to the action of an effective amount of hydrogen bromide and of di-tertiary butyl peroxide employed in an amount equal to between about 0.1% and about 5% by volume of the reactants, to effect the controlled catalytic oxidation of the propane, and recovering acetone from the reaction mixture thus formed.

2. In a process for the controlled oxidation of propane to produce acetone in which substantially equivolumetric amounts of propane and oxygen are subjected, at a temperature of between about 100° C. and about 225° C., to the action of hydrogen bromide employed in an effective amount not in excess of about 20 mol per cent, the improvement which comprises effecting this reaction in the presence of between about 0.1% and about 5% by volume of the total mixture of di-tertiary butyl peroxide.

3. In a process for the production of acetic acid wherein ethane and oxygen are reacted in the presence of an effective amount of hydrogen bromide at a temperature of between about 100° C. and about 225° C., the improvement which comprises effecting the reaction in the presence of between about 0.1% and about 5% by volume of di-tertiary butyl peroxide.

4. In a process for the production of desirable oxygenated products, the steps of subjecting vapors of a saturated aliphatic hydrocarbon having at least two carbon atoms per molecule to the action of oxygen in the presence of an effective amount of hydrogen bromide and of between about 0.1% and about 10% by volume of an organic peroxide, effecting the reaction at a temperature of between about 100° C. and about 225° C., and recovering the oxygenated products from the reaction mixture thus formed.

5. The process according to claim 4 wherein the saturated aliphatic hydrocarbons and the oxygen are employed in substantially equivolumetric proportions.

6. In a process for the production of desirable oxygenated products, the steps of subjecting an aromatic hydrocarbon to the action of oxygen in the presence of an effective amount of hydrogen bromide and between about 0.1% and about 10% of an organic peroxide unstable under the operating conditions and effecting the reaction at a temperature of between about 100° C. and about 225° C. to effect a substantial reaction between the aromatic hydrocarbon and the oxygen.

7. In a process for the production of desirable oxygenated products, the steps of subjecting an alicyclic hydrocarbon to the action of oxygen in the presence of an effective amount of hydrogen bromide and between about 0.1% and about 10% of an organic peroxide unstable under the operating conditions and effecting the reaction at a temperature of between about 100° C. and about 225° C. to effect a substantial reaction between the alicyclic hydrocarbon and the oxygen.

8. In a process for the controlled oxidation of organic compounds, the step of subjecting a hydrocarbon to the action of oxygen in the presence of an effective amount of hydrogen bromide and between about 0.1% and about 10% of an unstable organic peroxide and effecting the reaction at a temperature of between about 100° C. and about 225° C. to effect a substantial oxidation of the organic compound while avoiding spontaneous combustion.

FREDERICK F. RUST.
JOHN H. RALEY.
WILLIAM E. VAUGHAN.

REFERENCES CITED

The following references are of record in the file of this patent:

UNITED STATES PATENTS

| Number | Name | Date |
|---|---|---|
| 1,924,763 | Carpenter | Aug. 27, 1933 |
| 2,265,948 | Loder | Dec. 9, 1941 |
| 2,365,631 | Faith | Dec. 19, 1944 |

OTHER REFERENCES

Gilman, "Org. Chem.," vol I, pp. 490–541 (1938). (Scientific Lib.)